United States Patent [19]
Maganas et al.

[11] Patent Number: 5,928,618
[45] Date of Patent: Jul. 27, 1999

[54] METHODS FOR LOW TEMPERATURE DEGRADATION OF DIESEL EXHAUST AND OTHER ORGANIC MATTER

[75] Inventors: Thomas C. Maganas, 1200 Ardmore, Manhattan Beach, Calif. 90266; Alan L. Harrington, Oroville, Calif.

[73] Assignee: Thomas C. Maganas, Manhattan Beach, Calif.

[21] Appl. No.: 08/985,339

[22] Filed: Dec. 4, 1997

[51] Int. Cl.[6] ............................. B01D 53/83; B01D 53/94
[52] U.S. Cl. .................................. 423/212 C; 423/245.3; 423/247; 423/248; 423/215.5; 4313/5; 4313/7
[58] Field of Search ..................... 588/205, 226; 423/245.3, 213.2, 212 C, 215.5, 247, 248; 110/194, 245, 364; 502/55; 431/5; 437/7

[56] References Cited

U.S. PATENT DOCUMENTS

| | | | |
|---|---|---|---|
| 3,714,071 | 1/1973 | Michalko | 252/448 |
| 3,841,242 | 10/1974 | Sigg | 110/8 R |
| 4,052,173 | 10/1977 | Schultz | 48/202 |
| 4,308,806 | 1/1982 | Uemura et al. | 110/244 |
| 4,497,637 | 2/1985 | Purdy et al. | 48/111 |
| 4,623,400 | 11/1986 | Japka et al. | 148/6.35 |
| 4,886,001 | 12/1989 | Chang et al. | 110/346 |
| 4,974,531 | 12/1990 | Korenberg | 110/245 |
| 4,977,840 | 12/1990 | Summers | 110/346 |
| 4,991,521 | 2/1991 | Green et al. | 110/347 |
| 5,010,830 | 4/1991 | Asuka et al. | 110/347 |
| 5,181,795 | 1/1993 | Circeo, Jr. et al. | 405/128 |
| 5,335,609 | 8/1994 | Nelson et al. | 110/346 |
| 5,347,936 | 9/1994 | Thorhuus | 110/245 |
| 5,676,070 | 10/1997 | Maganas et al. | 110/245 |

FOREIGN PATENT DOCUMENTS

| | | | |
|---|---|---|---|
| 0176123 A1 | 4/1986 | European Pat. Off. . | |
| 2 701 223 A1 | 8/1994 | European Pat. Off. | 110/245 |
| 2687765 A1 | 2/1992 | France . | |
| 541962 | 12/1941 | United Kingdom | 502/55 |
| WO 93/24207 | 12/1993 | WIPO | 423/213.2 |

OTHER PUBLICATIONS

Guedes De Carvalho et al., Mass Transfer Around Carbon Particles Burning in Fluidised Beds, 63–70, Trans. IChemE., vol. 69, Part A (1991). Jan.

Molerus, O., Heat Transfer In Gas Fluidized Beds. Part 1, 1–14, Powder Technology, 70 (1992).

Shafey et al., Experimental Study On A Bench–Scale, Batch–Type Fluidized–Bed Combustor For Energy Production From Waste–Derived Fuels, 331–338, Energy, vol. 17, No. 4 (1992).

Kuipers et al., A Numerical Model Of Gas–Fluidized Beds, 1913–1924, Chemical Engineering Science, vol. 47, No. 8. (1992).

(List continued on next page.)

*Primary Examiner*—Gary P. Straub
*Assistant Examiner*—Timothy C Vanoy
*Attorney, Agent, or Firm*—Workman, Nydegger & Seeley; John M. Guynn

[57] ABSTRACT

Methods for catalyzing the low temperature, oxidative destruction of organic matter, particularly the incomplete combustion products of carbon-containing fuels such as fossil fuels. The methods and systems utilize a catalytically reactive media that is suspended by moving air within a reaction chamber and that is maintained at a temperature sufficient to cause the suspended media particles, typically silica sand, silica gel, or alumina, to become catalytically reactive in the presence of moisture. Typically, the reaction chamber is maintained at a temperature in a range from about 200° C. to about 500° C. Moisture may be provided by the organic matter, although additional moisture may be introduced into the reaction chamber in order to maintain reactivity of the media particles. The apparatus can be adapted to be used in combination with diesel engines or other internal combustion engines and industrial burners. The exhaust gases containing the incomplete combustion products can be further pressurized as needed.

20 Claims, 3 Drawing Sheets

OTHER PUBLICATIONS

Jean et al., Fluidization Behavior Of Polymeric Particles In Gas–Solid Fluidized Beds, 325–335, Chemical Engineering Science, vol. 47, No. 2 (1992).

Homsy et al., Report Of A Symoposium On Mechanics Of Fluidized Beds, 477–495, J. Fluid Mech., vol. 236 (1992).

Conversion Technology, Inc., Source Test Report: Fluid Bed Stripping For Particulates, Metals, POHCS, (1991) Jun.; 330 Holcomb Bridge Road Suit 250 Norcross, Georgia 30092 USA.

Seghers Engineering, Segers Zerofuel: A Concept For Autothermal Sludge Incineration (1992). Feb.

Agarwal, Kedar, Pyrolsis of Polymer Waste, pp. 232–245, Society of Plastic Engineers, "Plastics Recycling: Technology Charts the Course," (Nov. 4, 1994).

METHODS FOR LOW TEMPERATURE DEGRADATION OF DIESEL EXHAUST AND OTHER ORGANIC MATTER

BACKGROUND OF THE INVENTION

1. Field of the Invention

The present invention is in the field of destruction of organic waste and pollutants. More particularly the present invention is in the field of methods and systems for low temperature degradation of organic matter, particularly soot and other organic materials from diesel engine exhaust and other fossil fuel sources, medical wastes, animal corpses and other organic materials without the use of burning, incineration, or any form of high temperature combustion.

2. Review of the Relevant Technologies

Modern society has mastered the art of producing new goods but struggles to dispose of its wastes. While recycling can reduce the overall waste stream, there is still a huge amount of waste that simply does not lend itself to be recycled. The United States generates approximately 180,000,000 pounds of municipal solid waste every year, most of which is disposed in landfills. However, landfills are becoming a scarce commodity. The EPA has estimated that 90% of the country's existing landfills will reach capacity within the next decade. Because of increasing public protest and "not in my backyard" opposition, opening new landfill sites has become very difficult, increasing their cost and decreasing the number of new sites being constructed.

Most conventional thinking regarding the destruction of industrial, medical or municipal waste has revolved around some form of combustion, incineration or other extreme temperature solution. Because of the complexities and high temperatures utilized, these systems are expensive, must be centrally located, and are operated by highly trained technicians. While combustion, burning or incineration has proven effective in reducing the overall weight and volume of many wastes, these methods have not provided a truly effective solution to our society's current waste management problems. Because of the need to centrally locate combustion, burning or incineration systems, waste materials must be picked up, delivered and then destroyed at the central site. However, just as landfills are becoming increasingly difficult to open, incinerators have faced even greater opposition due to the perception that they are heavy polluters. This means that the use of incinerators as the means to effectively reduce the waste crises will ultimately fail.

The disposal of medical waste and other infectious materials in a manner that will not release dangerous pathogenic or disease-causing agents into the environment has always been a relatively expensive and difficult task. This is because it is necessary to first kill all pathogenic or potentially pathogenic agents, and then completely destroy the tissue to prevent further rotting and decay of the tissue. Otherwise, the tissue can provide a haven where later-introduced foreign pathogenic agents can thrive. For instance, it is inadequate to simply sterilize once-living human tissue and then dispose of it like ordinary refuse where it will be exposed to bacteria or other natural biodegradation agents. In the process of natural degradation, human infection-causing agents can find their way to the discarded human tissue, where they can thrive and then reinfect others. Such wastes must therefore be completely destroyed.

One method for destroying medical waste is incineration. While apparently both sterilizing and destroying the medical waste, the process has proved inadequate as a means to ensure total destruction of all pathogenic agents, including viruses. There is an inherent inability to achieve complete combustion or destruction of all viruses or other pathogenic agents before they find their way out the smoke stack, or flue, of the incinerator. "Cold pockets" can exist within the incineration chamber and flue through which viruses or other pathogens can escape unharmed from the incineration process. This is due to the interrelationship between the tremendous updrafts present in incinerator flues and the possibility that the chemical reaction dynamics necessary to completely destroy all viruses, bacteria, or other pathogens are inadequate to ensure complete destruction of the viruses or bacteria before they are carried up through the flue by the fast moving flue gases. Even if complete sterilization is achieved, incineration generally requires large inputs of fossil fuels.

With respect to other kinds of once living tissues, such as discarded animal or human corpses, the impending scarcity of available land for grave sites will severely inhibit the luxury of simply burying our dead in the future. In fact, many societies, both old and new, have customarily disposed of corpses in a manner that does not require the use of huge tracts of land. One such method is, of course, cremation. However, cremation, while generally effective, is analogous to the incineration method of destroying medical wastes and has each of its limitations, including the inability to achieve complete combustion of all inorganic materials, including viruses or other pathogenic agents, and the requirement of large energy inputs, usually in the form of fossil fuels.

Moreover, the environmental impact of the disposal of medical wastes or other once-living human or animal tissues should not be overlooked. Instead of incineration, some have attempted to first disinfect the infectious waste and then dispose of it in landfills which, as stated above, are in ever diminishing short supply. Moreover, such medical wastes must be specially disposed of to prevent environmental contamination, at least in part because of the aforementioned tendency of dead human tissues, even previously sterilized tissue, to harbor disease-causing bacterial or other pathogenic agents.

Because of the ever-increasing number of medical procedures and cures that are continuously being developed, the amount of medical wastes that will need to be disposed of every year will increase indefinitely. Moreover, the ever-increasing amount of biotechnical research and development being performed in order to find new cures for human or animal diseases is responsible for the creation of dangerous disease-causing agents that, if accidentally released into the environment, could be catastrophic to the health of humans or animals. Hence, the need to efficiently and completely disinfect these and the aforementioned medical wastes has become acute and will continue to increase into the future.

One recently developed method for disinfecting and destroying toxic medical wastes and other organic materials is to destroy them in situ within a land disposal site using extreme temperatures. For example, U.S. Pat. No. 5,181,795 to Circeo, Jr. et al., teaches a method for destroying biological wastes by drilling a series of holes into which the organic waste is to be disposed, inserting a plasma arc torch in each hole to pyrolyze, remediate, and vitrify (i.e., fuse) the waste materials, and then allowing the melted materials to cool down into essentially a chunk of glass. The drawbacks are the need for remote disposal sites and the requirement of large energy inputs, which are the same as for incineration.

U.S. Pat. No. 4,974,531 to Korenburg teaches methods and apparatus utilizing a fluidized bed for incinerating hazardous waste at temperatures from 1400° F. to 1800° F. Although this patent discloses that lower temperatures down to 300° F. can be used to disinfect the infectious waste, Korenburg teaches that actual destruction of such wastes in the fluidized bed occurs at high temperature (1400–1800° F.). Thus, Korenburg teaches yet another high temperature method for incinerating organic wastes, albeit using a fluidized bed to facilitate the incineration process. Also of interest is U.S. Pat. No. 4,308,806 to Uemura et al., which teaches the use of a fluidized bed incinerator operating at high temperatures (up to 1000° C.) for burning various types of industrial waste.

Another unfortunate problem associated with the modern economy involves pollutants that are produced in internal combustion engines. For instance, diesel engines are widely used in industrial applications, in commercial trucking vehicles, and in personal automobiles. Diesel engines have contributed to much economic activity, but also are a major source of air pollution. Combustion products that are generated in diesel engines from the burning of diesel fuel are ordinarily released into the air. Some of the most harmful pollutants generated in diesel engines and other systems that are powered by carbon-containing fuel are carbon soot and other pollutants that result from incomplete combustion. Carbon soot includes particulates of unburned hydrocarbons and other carbonaceous particulates. These fine particulates contribute to respiratory ailments and urban air pollution.

In response to pollution caused by gasoline-powered internal combustion engines, catalytic converters have been developed to reduce the levels of incomplete combustion pollutants that are emitted into the environment. Catalytic converters are typically positioned in the exhaust system of an internal combustion engine to fully oxidize at least a portion of the exhaust gases. The complete combustion products, particularly carbon dioxide and water, are considered more environmentally acceptable than their incomplete combustion counterparts. Conventional catalytic converters contain palladium or platinum which facilitate oxidation of exhaust gases. However, the foregoing metals are relatively rare and expensive. Moreover, catalytic converters are easily damaged, and a non-functioning catalytic converter is not readily detectible without an analysis of the exhaust gases.

While catalytic converters have provided some measure of reduction of harmful incomplete combustion pollutants from gasoline-powered engines, diesel engines have been largely exempted on economic grounds from the increasingly stringent pollution standards applicable to gasoline-powered vehicles. This public concern has translated into an increase in political pressure and activity to strengthen emission standards for diesel engines. There is a possibility that emission guidelines will be imposed in certain states that are strict enough to make long-distance trucking of goods cost-prohibitive, or that may even be impossible to comply with using conventional pollution control devices.

In view of the foregoing, it would be a significant advancement in the art to provide methods and systems that would result in complete and reliable destruction of medical wastes, corpses, and other organic matter.

It would be a further advancement in the art if such methods and systems resulted in the complete and reliable destruction of medical wastes, corpses, and other organic matter at temperatures lower than combustion temperatures.

It would be an additional advancement in the art if such methods and systems completely and thoroughly destroyed the medical waste, corpse, or other organic matter in a catalytic manner in order to reduce or eliminate the generation of noxious gases or other environmental pollutants, as can be produced using high temperature incineration methods.

It would be yet another advancement in the art to provide systems and methods that could destroy organic matter at lower than combustion temperatures in order to reduce the need for fossil fuel energy inputs.

It would be a considerable advancement in the art to provide apparatus for carrying out such methods that were relatively small and portable and that could be stationed at a variety of locations within a hospital, research laboratory, or other situs where medical wastes, corpses, or other organic matter need to be destroyed without the possibility that dangerous viruses or pathogens could be released into the environment, particularly at a hospital or laboratory where sterile conditions are especially vital, or through the transport of such wastes to available landfill sites.

It would be a further advancement in the art to provide systems and methods for oxidizing incomplete combustion products from diesel engines and other systems that burn fossil fuels, thereby replacing conventional catalytic converters that use palladium, platinum or other expensive catalytic agents.

Finally, it would be yet another advancement in the art to provide apparatus for carrying out such methods of oxidizing incomplete combustion products that are relatively lightweight and that may be economically installed on a vehicle that is powered by a diesel engine or another internal combustion engine.

Such methods and systems for catalytically destroying organic materials as described above are disclosed and claimed herein.

SUMMARY AND OBJECTS OF THE INVENTION

The present invention relates to improved methods and systems for the complete and reliable degradation of medical wastes, corpses, soot and other unburnt organic materials found in diesel engine exhaust and the exhaust from other fossil fuels. Such methods and systems not only ensure the complete destruction of the actual physical or visible wastes, tissues, or particulates, but also ensure the complete destruction of all viruses, bacterial, or other pathogenic agents that might be found in the medical wastes or animal tissues. Moreover, such destruction is carried out without the need for chemical sterilization, autoclaving at high temperature and pressure, high temperature incineration, plasma arcs, and the like. Instead, the present invention utilizes a reaction chamber containing a highly reactive media, such as silica, alumina, and the like, that have been activated at lower than combustion temperatures in the pressure of moisture to create highly reactive hydroxyl moieties.

Although the technology of providing a fluidizable medium in order to cause the pyrolysis or cracking of certain organic materials is known, it was heretofore not known that a reaction chamber containing an appropriate media could be used to completely and inexpensively destroy highly dangerous infectious wastes, exhaust particulates from the burning of fossil fuels, and other organic matter, while always ensuring complete and absolute sterilization of the waste and destruction of all pathogens. An example of a fluidized bed is found in European Patent Application Publication No. 0,176,123, filed Aug. 26, 1985, in the name of Geeroms (hereinafter "EU '123"), which discloses a "whirl bed" comprising a metal chamber, a fluidizable media such as silica, means for introducing heated gases through fluidizable media, and an afterburner for burning any gases that are formed by pyrolysis. The purpose for the whirl bed in EU '123 is to clean metal parts upon which paint, rubber, or other hard-to-remove substances have adhered. EU '123 appears to rely, however, on the combination of the abrasive action of the whiling sand media and a high enough temperature (preferably 650° C.) in order to effect the mechanical and pyrolytic removal of the adhered organic substances to clean the metal parts. EU '123 does not teach that at lower temperatures and in the presence of moisture that organic materials, such as medical wastes, corpses, municipal wastes, and exhaust particulates can be quickly and efficiently digested and completely degraded through catalytic action.

In contrast to EU '123 and others who have used fluidized bed technology, the inventors of the present technology have discovered that an abundance of very reactive hydroxyl radicals and other reactive hydrogen oxide species (and possibly other oxide species) can be generated through the interaction of water vapor and the otherwise apparently inert silica or alumina particles of the suspended media at relatively low temperatures below combustion temperatures. The media is suspended in a fairly static condition by means of air flowing upwards through the media. Although silica sand is largely comprised of monolithic crystals of silicon dioxide, it has been discovered that the surface of silicon dioxide particles in a suspended state can react at elevated, but noncombustion-supporting temperatures with water vapor to create a highly reactive bed of silica particles.

In the environment generated by the suspended media, the reactive silica surface appears to generate and emit, or somehow provide, highly reactive hydroxyl radicals or other reactive species that quickly oxidize any organic material coming in contact with, or even being in the vicinity of, the silica particles. Alumina also appears to generate very reactive oxidants under the same conditions. Although the exact chemical sequence is not completely understood, it has been discovered that a suspended media, in a fairly static state in which adequate moisture is present and which is heated to a temperature in a range from about 200° C. to about 500° C., is able to completely destroy an entire pig corpse, leaving no bones, teeth, or any detectable solid residue other than gases and traces of ash. This same environment has been found to effectively cause the catalytic oxidation of soot particles and other unburnt carbonaceous components found in exhaust from diesel and other exhaust gases from burning fossil fuels such as coal.

Providing an oxygen-rich environment also seems to increase the oxidative breakdown of the organic wastes, although breakdown is also observed even in an oxygen-poor environment within the reaction chamber so long as the media particles have been exposed to some degree of moisture.

As a result of the newly discovered interaction between the suspended media at the aforementioned temperatures in the presence of moisture to create a highly oxidative environment, and because it is desirable to promote as much oxidation as possible, it is usually not preferable to feed methane or other combustible gases into the suspended media. To do so would tend to compete with the medical waste or corpse for the oxidants that are generated. Contrary to EU '123, instead of feeding methane gas through the media, Applicants have found it preferable to simply feed heated air, preferably oxygen rich air, through the suspended media. Oxygen would be expected to interact with and enhance the oxidative action of the oxidants that are generated by the suspended media particles in the presence of water at elevated temperatures. Nevertheless, methane gas may be injected into the gases that come out of the reaction chamber in order to ensure complete combustion, such as in an afterburner.

An advantage of the present invention is the exploitation of the highly reactive nature of the hydroxylated media instead of the enormous amounts of energy that are expended in producing a hot enough incinerator to effectively destroy medical wastes and other organic matter by burning. This advantage is particularly apparent in light of the extremely low cost of typical media, such as silica or alumina, which are readily available, largely inert until exposed to the reactive conditions, and very abundant.

In the case where the medical waste or other organic matter generates appreciable amounts of halogen- or sulfur-containing vapors, it may be advantageous to expose the escaping gases to ammonia in an upper area of the reaction chamber or in an afterburner, in order to react with and bind such waste gases.

A preferred apparatus for the catalytic destruction of medical wastes or corpses includes a reaction chamber, an appropriate media, such as silica sand, silica gel, or alumina, means for suspending the media in a fairly static condition, means for maintaining the temperature of the reaction chamber to within a desired temperature range, means for maintaining the moisture content to within an appropriate range to ensure the continuous generation of hydroxyl moieties, means for collecting any ash or other solids generated by the reaction process, and means for exhausting the gases that are generated by the reaction process. The apparatus may optionally include means for introducing a variety of gases within the reaction chamber, such water vapor, oxygen, ammonia, etc. One such means for introducing gases are the air jets used to suspend the media. Another might be a port in the side of the reaction chamber.

In a preferred embodiment, the means for suspending the media, maintaining the temperature at the desired level, and introducing oxygen and water vapor rich gas into the reaction chamber all comprise air jets used to introduce heated air into the reaction chamber at a preferred temperature and velocity. In many cases it will not be necessary to enrich the reaction chamber with water vapor since medical wastes and corpses contain large amounts of water that are vaporized upon their being introduced into the reaction chamber. Nevertheless, while animal tissues may include moisture at the start, towards the end of the destruction process as the tissue become desiccated it may be necessary to input some amount of moisture to ensure complete destruction of the desiccated tissue. Moreover, in the case of dry organic matter, such as plastics which emit no water, it will often be necessary to enrich the moisture content in the reaction chamber. Sensors can be placed within the reaction chamber in order to regulate the input of water vapor, oxygen, heat, etc.

If flammable gases are generated in appreciable amounts by the reaction chamber, it may be preferably to ignite such gases by means of an afterburner. The heat that is generated within the reaction chamber, as well as heat produced by the optional afterburner, can be used to maintain the desired temperature of the reaction chamber. The heat held within the exhaust gases can be recirculated by means of, e.g., a heat exchange or by simply recycling some or all of the gases through the reaction chamber. In the latter scenario, it might be preferable to enrich the burnt gases with oxygen before feeding them back into the reaction chamber. Because of the catalytic nature of the reaction process, a more thorough breakdown of the intermediate gases that might otherwise be present by conventional incineration is carried out, thereby greatly reducing or eliminating altogether in most cases the generation of noxious fumes.

Because of the extremely simple apparatus used to carry out the reaction process, it is possible to greatly upscale or downscale the reaction apparatus size to accommodate a variety of uses. The reaction chamber may be very large in order to serve large institutional needs such as a huge medical or research complex, or to degrade municipal wastes. Conversely, the reaction chamber may be very small and portable if used to destroy a small but steady stream of medical wastes. The latter also provides for ease in moving and placement of the reaction chamber in the most convenient location.

Because medical wastes and other organic matter are quickly and efficiently disinfected and destroyed by the inventive process, it greatly simplifies the heretofore significant problems associated with the disposal of medical wastes and other organic matter. It also provides a means for the complete disposal of animal or human corpses while generating no more ash than traditional cremation by incineration, which requires far more energy to carry out and which is known to generate noxious gases. Because the reaction is carried out at temperatures below incineration temperatures, it uses less energy, is much safer to operate, and produces no clinkers.

Another embodiment of the invention is directed to systems and methods for catalytically oxidizing incomplete combustion products that may be produced by diesel engines, other internal combustion engines, and other systems that burn fossil fuels such as industrial plants. Such systems and methods significantly reduce that levels of certain pollutants that would otherwise be emitted into the atmosphere. The invention provides an improved system that utilizes very inexpensive silica and/or alumina as the catalyst instead of relatively expensive palladium or platinum. The system may be installed on a vehicle that is powered by a diesel engine.

Exhaust gases and suspended particles that are generated by burning fossil fuels are passed through a modified reaction chamber sized and configured for use with the vehicle or other fossil fuel user in question. Exhaust typically comprises incomplete combustion products, which may include carbon soot, carbon monoxide, diatomic hydrogen, among other compounds. The release of incomplete combustion products into the atmosphere is generally environmentally undesirable. At least a portion of the carbon soot in the exhaust is substantially oxidized, with the result that more environmentally acceptable exhaust products, such as carbon dioxide and water, are emitted into the environment.

The reaction chamber through which the exhaust passes contains an appropriate media, such as silica sand, silica gel, or alumina. Preferably, the media has a relatively high specific surface area, such that the weight of the reactive media is minimized. The reaction chamber also includes means for maintaining the temperature of the reaction chamber to within a desired temperature range, means for maintaining the moisture content to within an appropriate range to ensure the continuous generation of hydroxyl moieties, and means for exhausting the gases that are generated by the reaction process.

In view of the foregoing, an object and feature of the present is to provide methods and systems that result in the complete and reliable destruction of medical wastes, corpses, and other organic matter.

Another object and feature is to provide methods and systems that result in the complete and reliable destruction of medical wastes, corpses, and other organic matter at temperatures lower than combustion temperatures.

Yet another object and feature is to provide methods and systems which completely and thoroughly destroy the medical waste, corpse, or other organic matter in a catalytic manner in order to reduce or eliminate the generation of noxious gases as or other environmental pollutants, as can be produced using high temperature incineration methods.

It is yet another object and feature of the present invention to provide methods and systems that can destroy medical waste, corpses, and other organic matter at temperatures lower than combustion in order to reduce the need for fossil fuel energy inputs.

It is another object and feature of the present invention to provide apparatus for carrying out the foregoing methods that are relatively small and portable that can be stationed at a variety of locations within a hospital, research laboratory, or other situs where medical wastes, corpses, or other organic matter need to be destroyed without the possibility that dangerous viruses or pathogens can be released into the environment, particularly at a hospital or laboratory where sterile conditions are especially vital, or through the transport of such wastes to available landfill sites.

It is a further object and feature of the present invention to provide systems and methods for oxidizing incomplete combustion products from diesel engines and other systems that burn fossil fuels, thereby replacing conventional catalytic converters that use palladium, platinum or other expensive catalytic agents.

Finally, it is yet another object and feature of the invention to provide apparatus for carrying out such methods of oxidizing incomplete combustion products that are relatively lightweight and that may be economically installed on a vehicle that is powered by a diesel engine or another internal combustion engine.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity in detail to the use of the accompanying drawings in which.

DETAILED DESCRIPTION OF THE PREFERRED EMBODIMENTS

Figure 1:
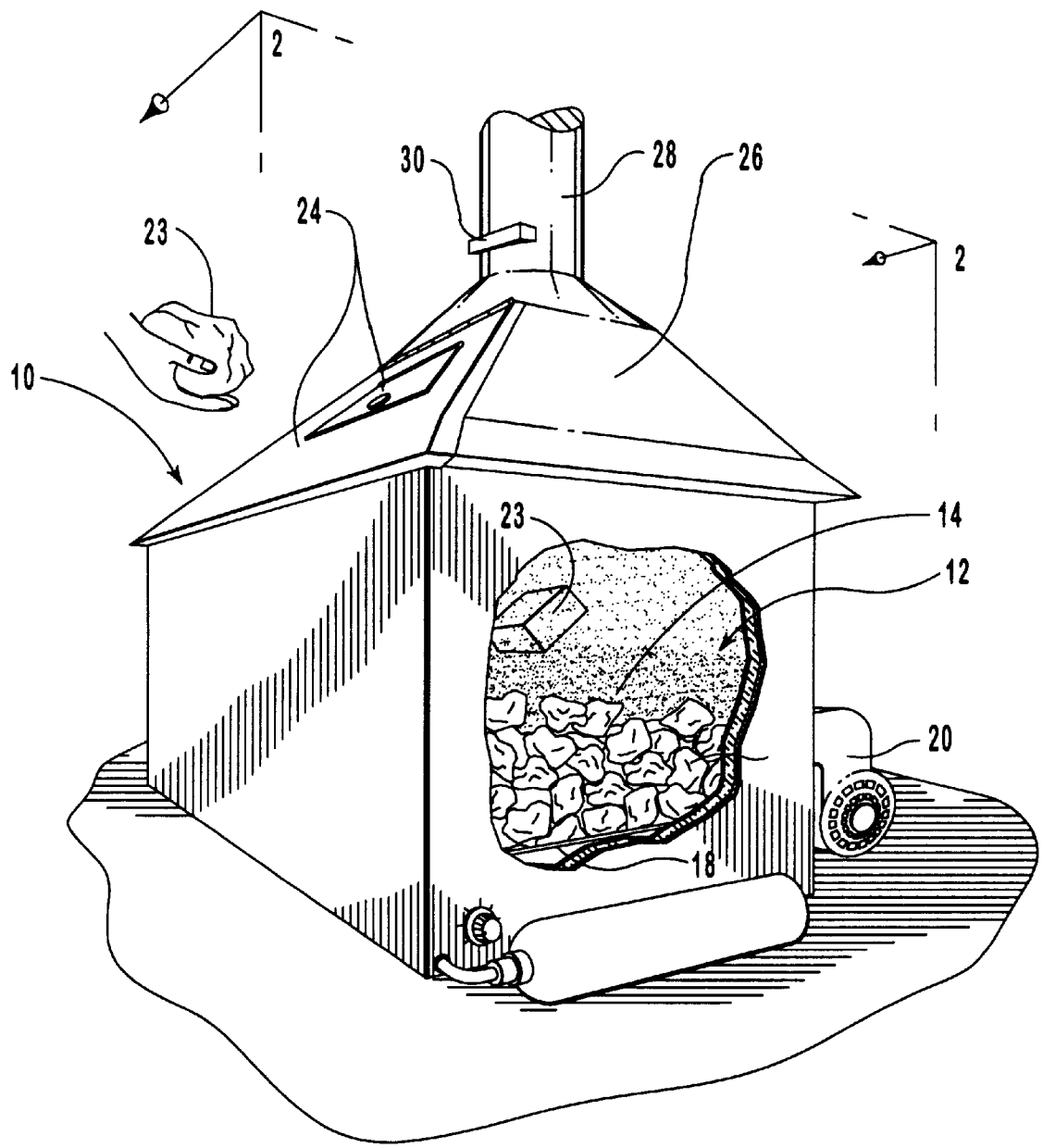
FIG. 1 is a perspective view of a preferred reaction apparatus into which a packet of medical waste is being inserted.

The present invention relates to improved methods and systems for disinfecting and completely degrading organic waste materials, particularly medical wastes and corpses, and also for destroying unburnt organic particulates and gases found in diesel exhaust and flue exhaust in industrial settings. Such methods and systems ensure the complete destruction of the organic wastes, as well as any pathogenic agents such as viruses and bacteria that may reside within e.g., medical wastes. The present invention utilizes the ability of a suspended media, such as silica or alumina, under highly reactive conditions, to generate highly reactive catalytic agents in the presence of moisture at below combustion temperatures in order to carry out the simple but complete destruction and disinfection of medical wastes, corpse, and other organic matter such as exhaust particulates and gases. Such destruction is preferably carried out in a single chamber, at a relatively constant temperature, and in a one-step process. This allows for the reliable destruction of organic wastes without the attendant problems of high temperature formation of $NO_X$ and $SO_X$ typical in high temperature combustion.

In a preferred embodiment, the invention relates to improved methods and systems for catalytically oxidizing incomplete combustion products in exhaust that is generated by the burning of fossil fuels, such as industrial flues and diesel engines. The exhaust containing unburnt or partially burnt combustion products is passed through a reaction chamber containing a suspended media, such as silica or alumina. The organic combustion products within the exhaust are substantially fully oxidized to $CO_2$, thereby producing emissions that are more environmentally acceptable than the untreated exhaust.

The terms "degrade" or "degradation", as used in the specification and the appended claims, refer to the breakdown of larger organic molecules within the organic waste material into smaller organic molecules, mainly through the catalytic cleavage of carbon-carbon bonds. These terms shall also refer to the cleavage of any other molecular bonds during the process of gasifying and oxidizing. The terms also include the complete oxidation of organic gases or particulates into carbon dioxide, water, and/or other completely oxidized compounds. Degradation of medical wastes does, however, generate a small amount of ash, which can be collected for sentimental reasons (in the case of cremation) or appropriately discarded. Moreover, no clinkers are formed because of the relatively low temperature.

The terms "medical waste" or "medical wastes", as used in the specification and the appended claims, shall refer to all human tissues that are removed from, or which otherwise have their origin in, the human body. These terms include, but are not limited to, tissues, organs, skin, tumors, bones, cartilage, connective tissue, blood vessels, and the like that are removed from the human body as a result of, e.g., surgery or other means for excision of such from the body. The term "medical waste" shall also include all similar tissues removed from animals, such as pets, cattle, zoo animals, and all other domestic and nondomestic animals, both warm and cold-blooded.

The terms "corpse", "animal corpse", and "human corpse", as used in the specification and the appended claims, shall have their ordinarily understood meanings and shall refer, for example, to any animal or human body that has expired, and which can be advantageously eliminated by the methods and systems described and claimed herein. The term "human corpse" is a subset of "animal corpse", which shall refer to the corpse of any living thing.

The terms "animal tissue", "once-living tissue", or "human tissue", as used in the specification and the appended claims, shall refer to any animal or human tissue, including medical wastes or corpses as defined above. The term "human tissue" is a subset of the term "animal tissue". Of course, while in some cases the medical waste or corpse being disposed of might be considered to be "living" in some sense of the word, such shall be considered to be within the definition of "once-living" if it has been separated from the body or is otherwise desirable of being discarded.

The term "organic matter" shall be understood to include any carbon-containing matter conventionally understood to include one or more organic molecules. Examples include municipal wastes, including garbage, animal and human waste, and carbon-containing incomplete combustion products.

The term "portable", as used in the specification and the appended claims, shall refer to the ability of the apparatus used to carry out the methods of the present invention, as embodied in certain embodiments, to be capable of being moved throughout a building or medical or research facility where needed. This movement of the apparatus might be by simply carrying the apparatus, wheeling the apparatus by means of a supporting stand equipped with rollers or wheels, or moving the apparatus by means of moving equipment (e.g., a forklift or small crane), the important feature being that a portable apparatus is not primarily a fixture as the term is commonly understood.

The term "incomplete combustion products", as used in the specification and the appended claims, shall refer to incompletely oxidized reaction products that are formed during combustion or other rapid oxidation processes. The incomplete combustion products may be, for example, gaseous, solid, particulate, liquid, or mixtures thereof. The term "carbon soot" is a subset of "incomplete combustion products", and includes unburnt and residual hydrocarbon particulates and other carbonaceous particulates.

The term "carbon-containing fuel" shall be understood to refer to any organic material that is combusted or burned in order to generate or release energy. The term "fossil fuel" is a subset of "carbon-containing fuel", and includes coal, oil, natural gas, and petroleum derivatives.

A preferred apparatus for carrying out the preferred method of destroying medical waste or corpses is illustrated in FIG. 1. The reaction apparatus 10 of FIG. 1 includes a catalytic reaction chamber 12 containing a catalytic medium 14 capable of catalyzing the oxidative degradation of medical wastes or corpses under appropriate conditions as described herein. The reaction chamber 12 is generally sealed except for where air is introduced into the bottom of the reaction chamber to suspend the media 14, where the medical waste, corpse, or other organic matter is introduced, and at the top of the reaction chamber where exhaust gases are removed.

The catalytic media 14 preferably comprises sand-like particles of any appropriate material such as silica sand, silica gel, alumina, and the like. Silica sand, silica gel, alumina, and mixtures thereof are preferred media because of their low cost. The catalytic media 14 may sit atop a bed of nonsuspendable pebbles or rocks 16, which are included mainly as a porous platform for the media, which allows for the passage of moving air throughout the suspended media 14 and the reaction chamber 12. The rocks 16 sit atop a support plate 18, which is sealed so that air introduced through the rocks 16 will travel upward through the catalytic media 14 and not downward. The support plate 18 preferably comprises a heat conductive metal to ensure effective transfer of heat in the case where the heat used to regulate the temperature of the reaction chamber 12 and the suspended media 14 lies beneath the surface of the reaction chamber.

Because it is preferred to suspend or levitate the catalytic media 14 with heated air the reaction apparatus 10 is equipped with means for suspending or levitating the media 14. A preferred suspending means includes air jets 20, which are preferably located within the rocks 16 to ensure a more disperse air flow through the catalytic media 14. However, the air jets 20 can be situated directly within the catalytic media 14, typically in embodiments where rocks 16 are not employed. The air that is introduced by means of air jets 20 may be preheated to approximately the desired temperature of the reaction chamber 12, or it may become heated by means of heat that radiates through the metal support plate 18 and rocks 16. In the latter case, it will be necessary to provide means for heating the support plate 18, which may comprise burners 22, or an electric resistive heater built therein. Of course, in the case where an electric heater is used it will be more efficient to simply situate the heater within the reaction chamber 12.

The air that is introduced into the reaction chamber by air jets 20 may be preheated by a number of means, including electric heating means or radiative heating means heated by a fuel such as natural gas, fuel oil, or coal, where it is desired to pass pure air through the reaction chamber. However, it may be more economical to simply burn natural gas directly into the air being introduced in the reaction chamber 12. Because the natural gas produces mainly water and carbon dioxide, the combustion gases should not inhibit the reaction process within the reaction chamber 12. In fact, the generation of water vapor would be expected to enhance the reactivity of the catalytic media 14. Because the combustion gases are preferably blended with air in order to provide the proper temperature conditions, the air that is introduced into the reaction chamber 12 will include adequate oxygen in most cases. However, it is possible to enrich the air with oxygen if desired to increase the reactivity within the reaction chamber 12.

The air that is introduced through air jets 20 should have sufficient velocity and pressure to cause the catalytic media 14 to become "suspended" or levitated in a fairly static condition, but not so great so as to churn the media 14 too vigorously or cause it to whirl vigorously. In order to ensure the best and most efficient reaction, it is preferably to blow just enough air through the catalytic media 14 to effect adequate suspension or levitation of the media and no more. The less air that actually passes through the reaction chamber 12, while maintaining adequate suspension of the media 14, the less energy and less enrichment gases that will be consumed.

The preferred reaction apparatus is equipped with means for introducing medical wastes, corpses, or other organic matter into the reaction chamber 12. As shown in FIG. 1, packets 23 of organic matter can be introduced into the reaction chamber 12 through a door 24. The door 24 should be capable of quickly opening to receive the waste packet 23 and then closing in order to maintain the proper conditions within the reaction chamber 12. In an alternative embodiment, a set of double doors 24 may be employed to better maintain heat within the reaction chamber 12, with a first door 24 opening to allow the introduction of a waste packet 23 within a pre-chamber, after which a second door 24 would open up into the reaction chamber proper.

In the case where very large packets of medical waste, corpses, or organic matter are introduced into the chamber, it might be preferable to open the reaction through a lid 26 covering the top of the reaction chamber. In some cases it may be necessary to restore the temperature within the reaction chamber 12 by temporarily increasing the temperature of the air that is introduced into the reaction chamber or by turning up the heat of burners 22. The organic matter itself will initially absorb some heat energy, although it would also be expected to generate heat upon commencement of the oxidative degradation process.

Connected to the lid 26 at the top of the reaction chamber 12 is exhaust conduit 28, which carries the waste gases to the appropriate location for emission into the outside air. In cases where the waste gases comprise appreciable amounts of combustible gases, it may be desirable to further combust them by means of an afterburner. Heat within the waste gases can be recycled back into the reaction chamber by any appropriate method known to those of ordinary skill in the art, such as by heat exchange, in order to heat up the air introduced into the reaction chamber, or by simply recirculating the gases back into the reaction chamber 12 to ensure complete breakdown of all organic gases. This may be one means of ensuring the complete destruction of any viruses or pathogenic agents, although it is believed that none can escape the reaction chamber during the waste destruction process. Because there are no cold pockets within the suspended media 14, the medical waste, viruses, bacteria, and all are at least completely disinfected if not fully broken down into gases. Viruses and bacteria, even if not vaporized immediately within the reaction chamber 12, are nevertheless effectively killed by the being exposed to heat in a temperature range from about 200° C. and about 500° C.

Within exhaust conduit 28 may be one or more optional filters 30, which are used to remove all fly ash or other airborne particles generated by the inventive reaction processes. In the case where, for sentimental reasons, it may be desired to collect the ashes from, e.g., the destruction of a corpse, the filters 30 provide such a means, particularly if equipped with shaking and collecting means that can be actuated between each batch for reliable collection of particular ashes that are generated so as to not commingle ashes from one corpse to another. If sentimental reasons are of no concern, the ashes can be discarded or used for, e.g., fertilizer, or any appropriate industrial purpose. A preferred filter is a ceramic filter.

In a preferred method for destroying both medical waste and animal or human corpses, the temperature of the suspended media within reaction chamber 12 is preferably maintained in a range from about 200° C. to about 500° C., more preferably in a range from about 250° C. to about 400° C., and most preferably in a range from about 300° C. to about 375° C. Below the lowest range the production of reactive hydroxyls and other reactive moieties is greatly inhibited. Above the uppermost range the excess heat may over dry the media particles such that they actually become less catalytically reactive.

Through mechanisms that are not entirely understood, the inventors have found that medical wastes, corpse, and other organic wastes may be efficiently and completely digested, degraded and oxidized by means of the catalytic media 14 if the media has been properly exposed to an adequate amount of moisture within the reaction chamber 12 in order to cause the generation of what are believed to be reactive hydroxyl radicals, hydrogen oxides, oxides, or other highly oxidative agents. Because of the oxidative nature of the reaction process, it is also preferable to ensure that there is abundant oxygen within the air being introduced into the reaction chamber. It is believed that it is the generation of highly reactive hydroxyls and other moieties that is responsible for the observed destruction of medical wastes and corpses.

The packets of medical waste or other organic matter may be encapsulated within any appropriate encapsulation material capable of being catalytically oxidized in the same manner as the medical waste within the reaction chamber 12. These include paper, plastic bags, and the like.

In many cases it might be desirable to adjust the composition of the atmosphere within the reaction chamber 12. For example, it may be necessary to increase the amount of oxygen within the reaction chamber 12 by intermittently injecting oxygen within the reaction chamber 12 in order to effect oxidation of a particular medical waste packet. In addition, it may be necessary to introduce more moisture in the form of water vapor within the reaction chamber 12 in order to more fully activate the suspended media particles. Because most medical wastes and corpses will naturally contain abundant water, it will usually be necessary to supplemental this water with additional moisture, at least at first. Nevertheless, it may be desirable to expose the catalytic media 14 to moisture before any wastes are first introduced into the reaction chamber in order to activate them. Finally, it may be desirable to introduce other reactive gases within the chamber such as ammonia gas, which can be added to precipitate halogens such as chloride or fluoride or sulfurous compounds that are generated during the degradation process. Any of these gases may be introduced together with the air by means of air jets 20, or within an afterburner.

The proper level of moisture, heat, and oxygen may be maintained by means of sensing means (not shown) located within the reaction chamber 12. Those of ordinary skill in the art of such sensing means will know how to integrate them into the inventive systems and methods disclosed herein. These sensing means can be coupled with a central processing unit that actuates valves on conduits used to input and regulate the amount of water, vapor, oxygen and heat that is introduced into the reaction chamber 12. The exact nature of how to regulate the inputs will be known to those of ordinary skill in the art.

Due to the wide disparity in moisture content of organic wastes, the amount of moisture that may be input to ensure that the media particles are adequately reactive may vary greatly. Enough moisture should be input to maintain catalytic destruction of the organic waste while not altering the temperature of the reaction chamber and media particles so much that it then falls outside of the desired operating temperature or temperature range.

Figure 3:
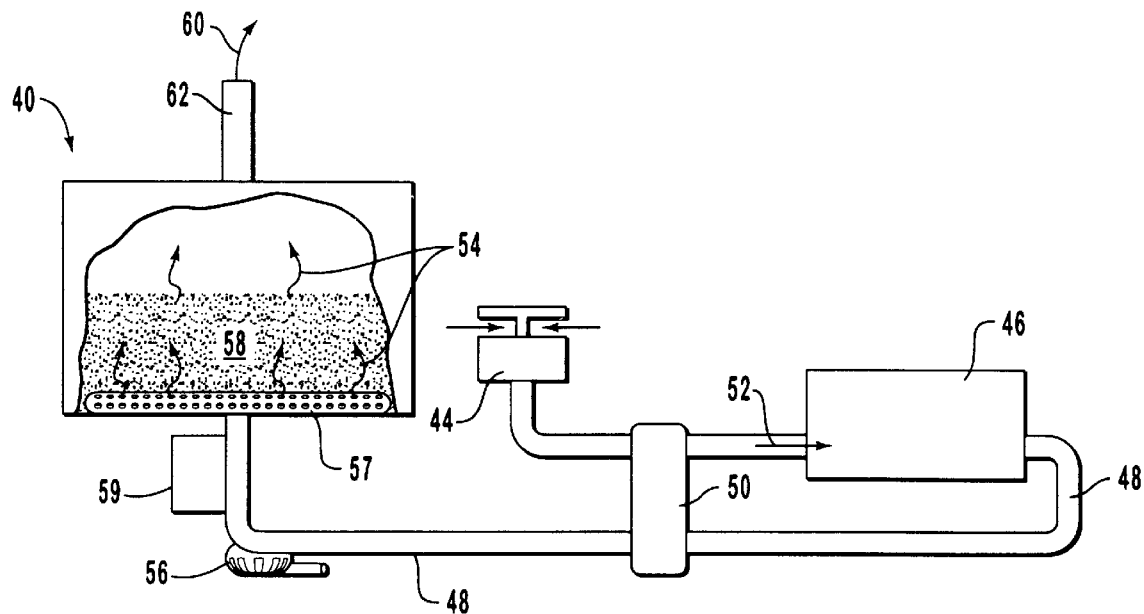
FIG. 3 is a cross-sectional view of a preferred reaction chamber used in combination with a diesel engine for oxidizing incomplete combustion products.

The foregoing system, including the reaction apparatus with a suspended, highly-reactive media, may be adapted for use in oxidizing incomplete combustion products from the burning of any carbon-containing fuel, such as fossil fuels. For example, as illustrated in FIG. 3, a reaction apparatus 40 may be used in combination with an internal combustion engine. For example, the internal combustion engine may be a diesel engine 42, or may alternatively be other internal combustion engines, or other devices that burn fossil fuels. Reaction apparatus 40 functions to more fully oxidize the exhaust products of an internal combustion engine than they otherwise would be and in a similar fashion to conventional catalytic converters.

A typical diesel engine 42 comprises an air intake 44, a combustion chamber 46, and an exhaust channel 48. A turbocharger 50 is configured to compress an intake air/fuel mixture 52 that is fed into the combustion chamber 46, thereby increasing the efficiency of diesel engine 42 by supplying more combustion air initially.

Exhaust products 54 are passed through means for introducing incomplete combustion products into reaction apparatus 40. One example of such means is exhaust channel 48. The majority of exhaust products 54 consists of inert nitrogen gas, carbon dioxide, water, and even oxygen gas. However, due to non-ideal air/fuel ratios, incomplete mixing, inefficiencies inherent during acceleration, or other reasons, some of the diesel fuel used in diesel engine 42 may not be completely burned. As a result, incomplete combustion products, including carbon soot and unburnt gases, are emitted from diesel engine 42. Such unburnt carbon-containing components are typically visible, particularly during the acceleration phase of a diesel powered vehicle.

These incomplete combustion products are environmentally harmful, and contribute to such environmental and public health problems as urban air pollution and respiratory disease. Fully oxidizing at least some of the incomplete combustion products using reaction apparatus 40 as disclosed herein would reduce the environmental damage that might otherwise occur if such unburnt soot and other carbonaceous products are emitted into the environment.

Exhaust products 54 typically leave the diesel engine 42 at temperatures of about 400° C. to about 550° C. However, exhaust products 54 begin to cool after leaving diesel engine 42 and entering exhaust channel 48. Generally, it is preferable to position reaction apparatus 40 relatively near diesel engine 42 so that exhaust products 54 do not cool to temperatures less than the preferred operating temperatures of reaction apparatus 40. The temperature at which reaction apparatus 40 should be operated in order to maximize the catalytic oxidation of the unburnt exhaust components is in a range from about 200° C. to about 500° C., more preferably in a range from about 250° C. to about 400° C., and most preferably in a range from about 300° C. to about 375° C.

Because exhaust products are generally not under sufficient pressure to cause catalytic media 58 to become suspended within reaction apparatus 40, a compression mechanism 56 may be used to increase the pressure of the exhaust products entering the reaction apparatus 40. Accordingly, the compression mechanism 56 may function as suspension means for suspending the particles that constitute catalytic media 58. Alternatively, the means for suspending the particles may comprise air jets or the like that are disposed at least partially within the reaction apparatus. What is important is that the gases, including the exhaust products 54, that pass through reaction chamber 40 have enough force to at least partially suspend catalytic media 58 for maximum reactivity of the media 58, although some reactivity of media 58 would be expected even if not suspended due to the inherent porosity between the media particles that allows for good diffusion of the unburnt exhaust products throughout the media 58.

Figure 2:
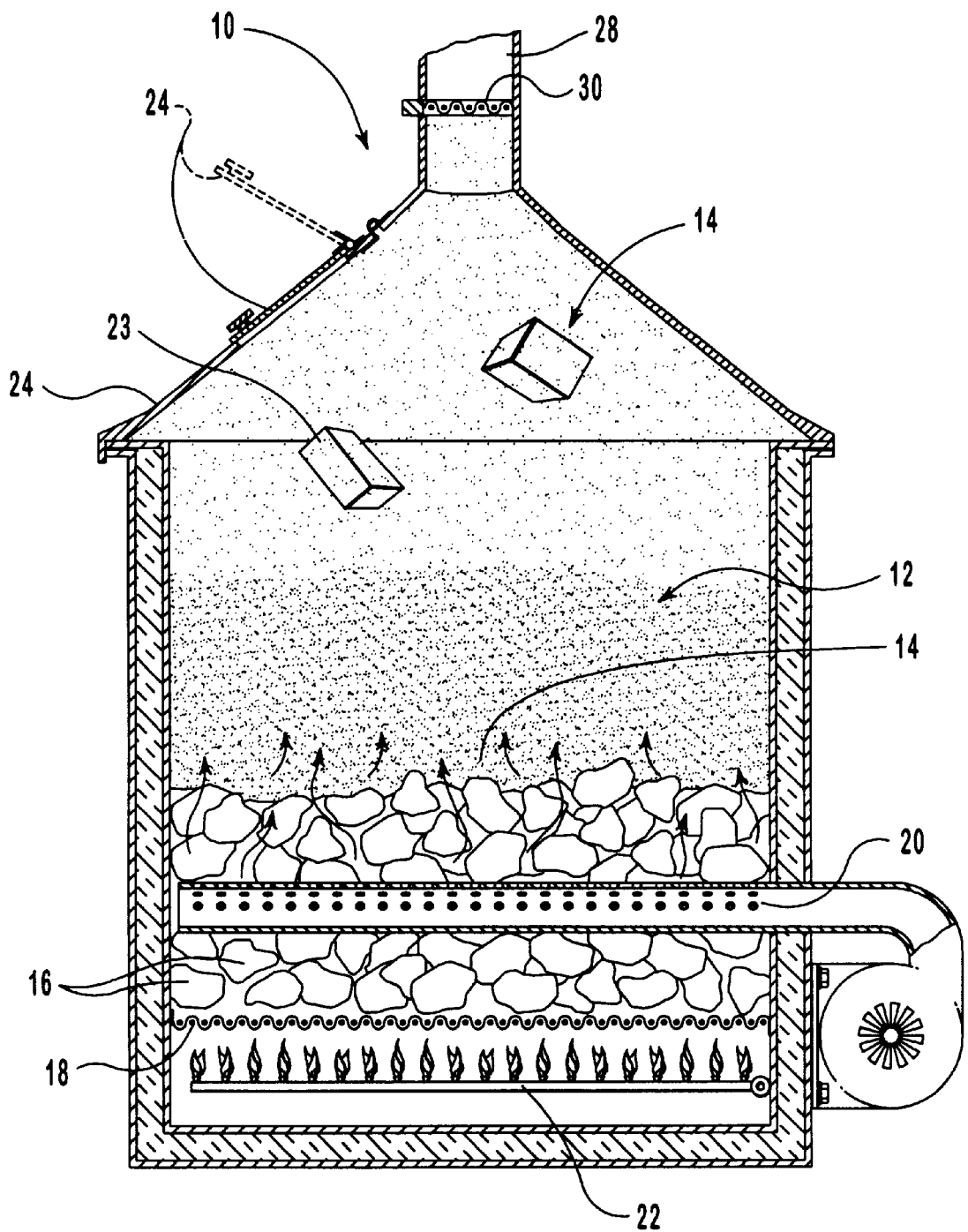
FIG. 2 is a cross-sectional view taken along plane 2—2 of the reaction apparatus of FIG. 1.

The system for catalytically oxidizing the incomplete combustion products further comprises means for maintaining the reaction apparatus at a temperature within the desired temperature range. Such means may involve a structure or system for cooling exhaust products 54 to the desired temperature. In such a case, the means may include for example, air inlet and compression mechanism 56 and/or positioning the reaction apparatus an appropriate distance from diesel engine 42. Under some circumstances, when reaction apparatus 40 cannot be positioned near enough to diesel engine 42 to maintain suitably high exhaust temperatures, the means for maintaining the reaction apparatus at a desired temperature may include heating means for increasing the temperature of exhaust products 54 to the desired operating temperature. By way of illustration, and not by restriction, such heating means may be electric heating means or radiative heating means heated by a fuel such as natural gas, fuel oil, or coal (see FIGS. 1 and 2).

The pressurized exhaust products 54 are introduced into reaction apparatus 40 by means of a venting system 57 or other suitable structure. The incomplete combustion products are thereby brought into contact or close proximity to the at least partially suspended catalytic media 58 within reaction apparatus 40. As in reaction apparatus 10 of FIGS. 1 and 2, the catalytic media 58 of reaction apparatus 40 in FIG. 3 preferably comprises sand-like particles of any appropriate material such as silica sand, silica gel, alumina, and the like. Moisture may be added to reaction chamber 40 as needed using, for example, a moisture supply system 59.

It is also advantageous to select a catalytic media 58 wherein the particles have a relatively high specific surface area. It is believed that it is the surface area of the reactive particles that generates the reactive hydroxyl radicals within reaction apparatus 40. Accordingly, increasing the surface area of the media particles without increasing their weight would allow for the use of a lower mass of reactive media while maintaining adequate reactivity. Reduced weight is particularly desirable in the present embodiment, since reaction apparatus 40 is typically installed in and carried by a diesel-powered vehicle. The amount of silica particles that is needed may be significantly reduced when the grain size is reduced and/or the surface of the particles is made to be more irregular, both of which tend to increase the specific surface area of the media particles. It will also be understood that reducing the amount of silica or other reactive media generally reduces the percentage of carbon soot and other incomplete combustion products that is removed from exhaust products 54. Thus, the preferred amount of reactive media is determined by a trade-off involving reactor weight on the one hand and reactor efficiency on the other.

Figure 4:
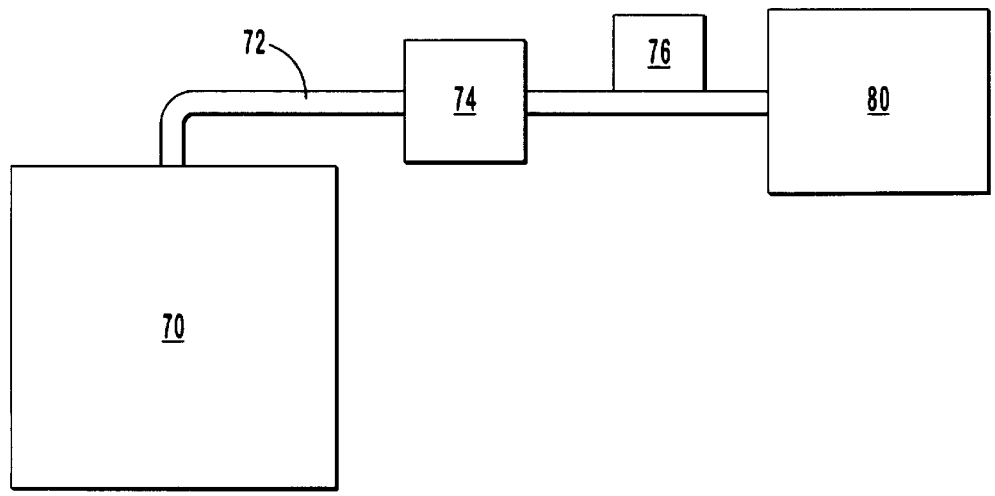
FIG. 4 is a cross-sectional view of a reaction chamber used in combination with an industrial exhaust flue.

Catalytic media 40 facilitates the oxidation of the incomplete combustion products of exhaust products 54. In particular, at least carbon soot and unburnt organic gases are converted into carbon dioxide and water, while other incomplete combustion products may be converted into their respective fully oxidized counterparts. The oxidized products are then discharged as emissions 60 through vent 62. In other respects, reaction apparatus 40 functions in much the same way as reaction apparatus 10 that is disclosed herein. The reaction chambers according to the present invention can be modified to catalytically oxidize virtually any waste organic matter. For example, FIG. 4 illustrates a reaction chamber 80 used to catalytically oxidize unburnt carbon-containing exhaust components from an industrial burner 70. Such industrial burners commonly burn coal or fuel oil, both of which are known to generate unburnt components, such as soot and unburnt gases. The exhaust gases are carried from the burner 70 to the reaction chamber 80 by means of exhaust conduit 72. A compression means 74 is generally used to ensure adequate pressure of the unburnt gases as they are fed in reaction chamber 80. A moisture introducer 76 can be used in order to ensure adequate production of reactive hydroxyls. The temperature of reaction chamber 80 can be controlled by any of the means discussed elsewhere in the application or adapted by those of ordinary skill in the art.

Several examples of embodiments of the invention are presented in order to demonstrate the practicability and usefulness the invention.

EXAMPLE 1

In order to demonstrate that a suspended catalytic media within a reaction chamber would work to destroy a wide variety of once-living tissues, including medical wastes, corpses, and other organic matter, a piglet corpse weighing about 35–40 lbs. was placed within a reaction chamber containing silica sand as the catalytic media. The reaction chamber was adapted from a commercially available fluidized bed for cleaning mechanical parts manufactured by Dinamec, which is located in Belgium. The temperature of the reaction chamber was held to within a range from about 420–425° C. Because the reaction chamber was not visible from the outside, it was not possible to visually detect how fast the piglet corpse was digested and destroyed. However, after 45 minutes, the reaction chamber was opened up and inspected. Nothing remained of the piglet corpse: there were no bones, no teeth, no tissues that could be detected, which proved that the media particles under the above stated conditions became highly reactive and able to completely destroy the entire piglet corpse. This is especially evident since the reaction temperature was far below the ignition temperature required to burn a corpse.

EXAMPLE 2

The invention has been used in subsequent experiments to dispose of once-living tissue in the form of medical waste in actual waste disposal conditions. Waste tissues and other organic materials were placed within a reaction chamber on a regular and ongoing basis. The reaction chamber was operated according to the methods disclosed herein. It was found that an afterburner was not needed to burn off excess gases during operation of the reaction chamber, since essentially no flammable gases could be detected. It was determined that the medical waste and other organic matter that was disposed was completely degraded, leaving no detectable solid residue except for a quantity of metallic oxides and other metal-containing compounds in the form of ash. The quantity of the ash that remained after disposal was found to be about 2% by weight of the organic matter that was initially disposed. The most preferred operating temperature was determined to be within a range from about 300° C. to about 375° C.

EXAMPLE 3

A reactor chamber of the type described herein for use with internal combustion engines is tested in combination with a conventional diesel engine that is typically used in commercial trucks. Common crystalline silica that is readily commercially available is used as the catalytic media within the reaction chamber. A reaction chamber operated under conditions disclosed herein with a quantity of 1,700 lbs. of silica is found to be sufficient to oxidize and eliminate up to about 98% of the carbon soot that is emitted by the diesel engine when the reactive silica media is kept within a temperature range of about 300° C. to about 375° C.

EXAMPLE 4

The test conducted in Example 3 is repeated using only 250 lbs. of silica instead of 1,700 lbs. It is determined that the reaction chamber with 250 lbs. of silica removes up to about 60% of the carbon soot that is emitted by the diesel engine.

EXAMPLE 5

A reaction chamber containing silica is used to remove up to 98% of the soot and other unburnt carbonaceous materials emitted in the flue gas from an industrial burner that utilizes coal or fuel oil. Because the industrial plant is stationary, and because silica is extremely inexpensive, an amount of silica appropriate for oxidizing the unburnt components from the industrial burners is used. The temperature is maintained within a range from about 300° C. to about 375° C. by appropriate means and the moisture content of the gases within the reaction chamber is maintained by appropriate means, such as by, e.g., a humidifier.

In conclusion, the above-identified methods and systems provide a simple and reliable way to ensure the complete destruction of pathogen-containing medical wastes, human or animal corpses, or other organic matter using a reaction chamber that is relatively inexpensive, small, and portable, particularly in comparison to incinerators, which comprise huge structures that must be built separately from the hospital or research facilities that they might serve. For example, a relatively small reaction chamber measuring six feet long, three feet wide, and three feet tall can destroy about 250 pounds of medical waste per hour, which greatly exceeds the needs of most individual hospitals or research facilities. The relatively low energy requirements of the reaction chamber can be met by conventional natural gas conduits found in most buildings, bottled gaseous fuels, such as propane or butane, liquified fuels, such as gasoline, kerosine, diesel, or fuel oils, or electrically powered heating units.

Of course, the dimensions of the reaction chamber can be altered for any particular need. The reactor may be reduced in size to fit into smaller areas where only minor amounts of medical wastes are generated. Conversely, the reactor may be increased in size in order to serve a very large institution. Of course, while having many incinerators within different wings of a large hospital would be entirely impractical, if not impossible, having many small reaction chambers throughout a hospital would be quite feasible and, in fact, might actually be desirable for convenience. In addition, having a conveniently located reaction chamber could greatly cut down the time between when the medical waste is first generated and when it is actually destroyed. The potential for dangerous disease-causing agents to escape into the environment is greatly reduced if the medical waste can be more quickly and efficiently destroyed. The present invention clearly serves this valuable function. Moreover, a conveniently located reaction chamber obviates the need to transport the toxic medical wastes to more remotely located disposal sites. This cuts down the handling time and costs since the waste must normally be treated very cautiously and delicately to prevent the escape of pathogens into the environment.

Alternatively, the reaction chamber might be appropriately proportioned to effect the oxidative degradation of human or animal corpse, diesel exhaust particles and unburnt gases, or other organic matter. In many countries throughout the world, particularly those that are densely populated or which otherwise do not share the tradition of interring bodies within the earth, the present invention provides a cleaner, more efficient method for the cremation of human corpses. The destruction of animal corpses by the methods and systems of the present invention would be advantageous in, e.g., research laboratories or slaughter houses. In the event that the ash remains of a human corpse are desired for sentimental reasons, the reaction chamber can be provided with screens or sieves for the recovery of the ashes. Where sentimental concerns do not play a role, the ash recovered by such means can be disposed of or used for, e.g., fertilizer.

Finally, the reaction chamber can be upsized in order to destroy huge quantities of organic matter, such as municipal wastes, and also flue gases from industrial burners.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for catalytically degrading incomplete combustion products of carbon-containing fuel comprising the steps of:

suspending a catalytically reactive media within a reaction chamber, said media consisting essentially of a plurality of particles selected from the group consisting of silica, alumina, and mixtures thereof, wherein the reaction chamber is maintained at a temperature in a range from about 200° C. to about 500° C. such that the media particles become catalytically reactive in the presence of moisture; and introducing incomplete combustion products of carbon-containing fuel into the reaction chamber while maintaining the temperature in the range from about 200° C. to about 500° C. in order for the catalytically reactive media particles to contact or come into close proximity to the incomplete combustion products and catalytically degrade the incomplete combustion products.

2. A method for catalytically degrading incomplete combustion products of carbon-containing fuel as defined in claim 1, wherein the incomplete combustion products of carbon-containing fuel are produced by a diesel engine.

3. A method for catalytically degrading incomplete combustion products of carbon-containing fuel as defined in claim 1, wherein the reaction chamber is maintained at a temperature in a range from about 250° C. to about 400° C.

4. A method for catalytically degrading incomplete combustion products of carbon-containing fuel as defined in claim 1, wherein the reaction chamber is maintained at a temperature in a range from about 300° C. to about 375° C.

5. A method for catalytically degrading incomplete combustion products of carbon-containing fuel as defined in claim 1, wherein at least a portion of the heat necessary to maintain the reaction chamber at a temperature in a range from about 200° C. to about 500° C. is supplied by exhaust gases of an internal combustion engine.

6. A method for catalytically degrading incomplete combustion products of carbon-containing fuel as defined in claim 1, wherein the incomplete combustion products of carbon-containing fuel are produced by an internal combustion engine.

7. A method for catalytically degrading incomplete combustion products of carbon-containing fuel as defined in claim 1, wherein the incomplete combustion products of carbon-containing fuel are produced by an industrial burner.

8. A method for catalytically degrading incomplete combustion products of carbon-containing fuel as defined in claim 1, wherein the carbon-containing fuel is a fossil fuel.

9. A method for catalytically degrading incomplete combustion products of carbon-containing fuel as defined in claim 8, wherein the fossil fuel is selected from the group consisting of coal, oil, natural gas, petroleum derivatives, and mixtures thereof.

10. A method for catalytically degrading incomplete combustion products of carbon-containing fuel as defined in claim 1, wherein the incomplete combustion products are selected from a group consisting of unburnt residual hydrocarbons carbon soot, carbon monoxide, hydrogen gas, and mixtures thereof.

11. A method for catalytically degrading incomplete combustion products of carbon-containing fuel as defined in claim 1, further including the process of introducing moisture into the reaction in addition to moisture supplied by the incomplete combustion products.

12. A method for catalytically degrading incomplete combustion products of carbon-containing fuel as defined in claim 1, further including the process of introducing oxygen into the reaction in addition to oxygen supplied by the incomplete combustion products.

13. A method for catalytically degrading incomplete combustion products of carbon-containing fuel as defined in claim 1, further including the process of increasing the pressure of the incomplete combustion products prior to introducing them into the reaction chamber.

14. A method for catalytically degrading incomplete combustion products of carbon-containing fuel produced by an internal combustion engine comprising the steps of:

suspending a catalytically reactive media within a reaction chamber, said media consisting essentially of a plurality of silica particles, wherein the reaction chamber is maintained at a temperature in a range from about 200° C. to about 500° C. such that the media particles become catalytically reactive in the presence of moisture; and introducing incomplete combustion products of carbon-containing fuel produced by an internal combustion engine into the reaction clamber while maintaining the temperature in the range from about 200° C. to about 500° C. in order for the catalytically reactive media particles to contact or come into close proximity to the incomplete combustion products and catalytically degrade the incomplete combustion products.

15. A method for catalytically degrading incomplete combustion products of carbon-containing fuel as defined in claim 14, wherein the reaction chamber is maintained at a temperature in a range from about 250° C. to about 400° C.

16. A method for catalytically degrading incomplete combustion products of carbon-containing fuel as defined in claim 15, wherein the internal combustion engine is a diesel engine.

17. A method for catalytically degrading incomplete combustion products of carbon-containing fuel produced by a diesel engine comprising the steps of:

suspending a catalytically reactive media within a reaction chamber, said media consisting essentially of a plurality of silica particles, wherein the reaction chamber is maintained at a temperature in a range from about 200° C. to about 500° C. such that the media particles become catalytically reactive in the presence of moisture; and introducing incomplete combustion products of carbon-containing fuel produced by a diesel engine into the reaction chamber while maintaining the temperature in the range from about 200° C. to about 500° C. in order for the catalytically reactive media particles to contact or come into close proximity to the incomplete combustion products and catalytically degrade the incomplete combustion products.

18. A method for catalytically degrading incomplete combustion products of carbon-containing fuel produced by an internal combustion engine comprising the steps of:

suspending a catalytically reactive media within a reaction chamber, said media consisting essentially of a plurality of particles selected from the group consisting of silica, alumina, and fixtures thereof, wherein the reaction chamber is maintained at a temperature in a range from about 250° C. to about 400° C. such that the media particles become catalytically reactive in the presence of moisture; and introducing incomplete combustion products of carbon-containing fuel produced by an internal combustion engine into the reaction chamber while maintaining the temperature in the range from about 250° C. to about 400° C. in order for the catalytically reactive media particles to contact or come into close proximity to the incomplete combustion products and catalytically degrade the incomplete combustion products.

19. A method for catalytically degrading incomplete combustion products of carbon-containing fuel produced by an industrial burner comprising in steps of:

providing incomplete combustion products of carbon-containing fuel produced by an industrial burner;

increasing the pressure of the incomplete combustion products produced;

suspending a catalytically reactive media within the reaction chamber, said media consisting essentially of a plurality of particles selected from the group consisting of silica, alumina, and mixtures thereof, wherein the reaction chambers maintained at a temperature in a range from about 200° C. to about 500° C. such that the media particles become catalytically reactive in the presence of moisture; and introducing the incomplete combustion products into the reaction chamber while maintaining the temperature in the range from about 200° C. to about 500° C. in order for the catalytically reactive media particles to contact or come into close proximity to the incomplete combustion products and catalytically degrade the incomplete combustion products.

20. A method for catalytically degrading incomplete combustion products of carbon-containing fuel as defined in claim 19, wherein the reaction chamber is maintained at a temperature in a range from about 250° C. to about 400° C.

* * * * *

UNITED STATES PATENT AND TRADEMARK OFFICE
CERTIFICATE OF CORRECTION

PATENT NO. : 5,928,618
DATED : Jul. 27, 1999
INVENTOR(S) : Thomas C. Maganas; Alan L. Harrington It is certified that error appears in the above-identified patent and that said Letters Patent is hereby corrected as shown below:

Col. 5, line 6, after "of the" change "whiling" to --whirling--

Col. 6, line 48, after "tissue" change "become" to --becomes--

Col. 6, line 57, after "may be" change "preferably" to --preferable--

Col. 7, line 33, after "reduce" change "that" to --the--

Col. 8, line 9, after "gases" delete "as"

Col. 13, line 18, before "this" change "supplemental" to --supplement--

Col. 15, line 8, before "thereby" change "arc" to --are--

Col. 15, line 43, after "herein." insert a paragraph break

Col. 18, line 8, after "claims" change "arc" to --are--

Signed and Sealed this

Thirteenth Day of June, 2000

*Attest:*

Q. TODD DICKINSON

*Attesting Officer*  *Director of Patents and Trademarks*